| United States Patent [19] | [11] 3,930,884 |
|---|---|
| Zimmermann et al. | [45] Jan. 6, 1976 |

[54] ACTIVATED STABLE OXYGEN ELECTRODE

[75] Inventors: Georg Zimmermann; Manfred Schonborn, both of Gerlingen; Horst Magenau, Stuttgart; Horst Jahnke, Gerlingen; Brunhilde Becker, Stuttgart, all of Germany

[73] Assignee: Robert Bosch G.m.b.H., Stuttgart, Germany

[22] Filed: May 8, 1974

[21] Appl. No.: 467,911

[30] Foreign Application Priority Data
 May 25, 1973 Germany............................ 2326667

[52] U.S. Cl....... 136/86 D; 136/120 FC; 252/431 N
[51] Int. Cl.² ...................... H01M 4/88; H01M 4/90; B01J 31/12
[58] Field of Search............ 136/86 D, 120 FC; 252/431 N

[56] References Cited
UNITED STATES PATENTS

| 3,585,079 | 6/1971 | Richter et al. ..................... 136/86 A |
| 3,617,388 | 11/1971 | Matsuda et al. ................ 136/120 FC |
| 3,649,365 | 3/1972 | Paynter et al. .................. 136/120 FC |
| 3,658,721 | 4/1972 | Tamaru et al. ............. 252/431 N X |
| 3,773,878 | 11/1973 | Jahnke........................... 136/120 FC |
| 3,778,313 | 12/1973 | Reber et al. .................... 136/120 FC |
| 3,821,028 | 6/1974 | Ziener et al. ..................... 136/86 D |

OTHER PUBLICATIONS

Chem. Abstr., Vol. 70, 43557z (1969).
G. Sandstede, Editor, "From Electrocatalysis To Fuel Cells," pp. 113–125, Univ. of Washington Press, Seattle (1972).
F. Cotton et al., "Advanced Inorganic Chemistry," Second Edition, Interscience, New York, 1966 page 625.

*Primary Examiner*—Howard S. Williams
*Assistant Examiner*—Aaron Weisstuch
*Attorney, Agent, or Firm*—Flynn & Frishauf

[57] ABSTRACT

A stable oxygen electrode which is in an active state and retains said activity for a long service life. The electrode comprises an electrode carrier and an activated transition metal chelate of 5,14-dihydrodibenzo(5,9,14,18)tetraaza(14)annulene. Said metal chelate is activated by heating in an inner gas atmosphere at a temperature of between about 600° and 1000°C for at least 5 minutes.

8 Claims, No Drawings

ACTIVATED STABLE OXYGEN ELECTRODE

This invention relates to a process for activating catalysts for electrodes of electrochemical cells, particularly of fuel cells, with a transition metal chelate of 5,14-dihydrodibenzo(5,9,14,18)tetraaza(14)-annulene as the catalyst, and to electrodes utilizing said catalysts.

An important requirement for the use of fuel cells on a wider basis is the presence of highly active and inexpensive catalysts, both for the anodic oxidation of fuels that are of interest from an economic point of view, such as methanol, formaldehyde, formic acid, carbon monoxide, oxalic acid and others, and also for the cathodic reduction of oxygen. The relative scarcity and high price of the noble metals has stood in the way of their wider use as catalysts. Research has accordingly been concentrated on the development of catalysts without noble metal content.

A metal chelate of 5,14,-dihydrodibenzo(5,9,14,18)tetraaza(14)-annulene has been disclosed as such a noble-metal-free catalyst both for the anodic and the cathodic reactions. These chelates with cobalt, iron, copper or nickel as the central atom are preferred. These chelates are hereinafter designated CoTAA, FeTAA CuTAA and NiTAA, respectively, for short.

The preparation of these chelates has been disclosed by H. Hiller, P. Dimroth and H. Pfitzner in Liebigs Ann. Chem. 717 (1968) 137–147 (*Chemical Abstracts*, 1969 Vol. 70:43557z) which is incorporated herein by reference. Briefly, these chelates may be prepared by reacting o-phenylenediamine, propargylaldehyde and the corresponding metal (II)-acetates and have the following structural formula:

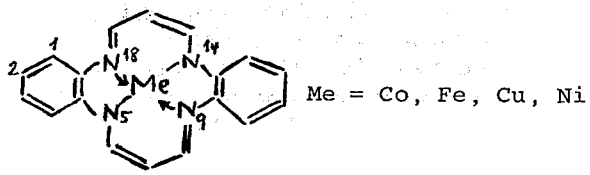

Me = Co, Fe, Cu, Ni

Among the chelates above named, CoTAA has up to now given the best results.

Particularly favorable values for the activity of these catalysts can be obtained if the electrode provided with the catalyst is, as soon as it is put into service, subjected for a little while to potentials above 500mV. In this manner active catalysts can be obtained, particularly for fuel oxidation. When used as oxygen catalysts, a relatively high activity is exhibited initially. However, the catalyst is not stable and becomes practically inactive after about one day of experimental use.

It is an object of the present invention to provide a process that will activate a metal chelate of 5,14-dihydrodibenzo(5,9,14,18)tetraaza(14)-annulene as a catalyst and will stabilize its activity in such a manner that it can be used in electrochemical cells, either as an anode or as a cathode according to the choice of activating conditions, and in each case will have an adequate service life and the highest possible specific catalytic activity with reference to the reaction to be promoted. This prevents the production of mixed potentials at a given electrode.

SUBJECT MATTER OF THE INVENTION:

The said catalyst is provided with activity over a useful service life by tempering at a temperature above 400°C in an inert gas atmosphere.

If the catalyst is to be provided for a fuel electrode, it is tempered at a temperature between 400° and 500°C in an inert gas atmosphere. A catalyst thus treated shows very good activity and stability when used in a fuel electrode. If used as an oxygen electrode, it exhibited a similarly high initial activity which falls off very quickly and finally disappears entirely. This is probably because the catalyst is not stable when subjected to the high potentials of at least 750 mV that are found in an oxygen electrode and thus is converted into an inactive compound.

The stability of the tempered catalysts under high potentials and in the presence of oxygen is surprisingly substantially greater if the tempering is carried out at still higher temperatures.

If the catalyst, therefore, is to be used for an oxygen electrode, the tempering is carried out at a temperature between 600° and 1000°C, again in an inert gas atmosphere. The catalyst thus obtained shows an outstanding activity with respect to oxygen, but is practically inactive with fuels.

The invention also provides electrodes having catalytic activity which are useful in fuel cells comprising an electrode carrier and a catalyst for the electrochemical reaction carried out at said electrode, said catalyst comprising an activated metal chelate of 5,14-dihydrodibenzo-(5,9,14,18)tetraaza(14)-annulene. The said activated metal chelate is activated by heating in an inert gas atmosphere at a temperature above 400°C as set forth hereinbefore.

The fuel electrodes contain as the catalytic material, at least one of the specified metal chelates which had been heated to between about 400° and 500°C. The oxygen electrodes contain as the catalytic material, at least one of the specified metal chelates which has been heated to between about 600° and 1000°C.

The heat treating temperature must be held up for a minimum time of 5 minutes.

It is advantageous, for increasing the electric conductivity of the oxygen electrode from the catalytic material if the metal chelate is admixed, preferably prior to tempering, with a carbon component, for example, activated charcoal or acetylene soot. The carbon content in such case can range up to three times the amount, by weight of the catalyst. The conductivity of the fuel electrode is also improved if the metal chelate is admixed with an active form of carbon carbon as aforesaid.

CoTAA begins to sublime at 370°C, but at the highest temperatures used, about 850°C, it sublimes only to the extent of 30 to 40 percent by weight of the starting chelate material.

The present invention makes it possible to activate the above-described known metal chelate material as a fuel catalyst or as an oxygen catalyst for an electrochemical cell depending upon the activation conditions. When prepared as an oxygen catalyst, it exhibits practically no catalytic activity for the fuel electrode reactions. Thus it is not necessary to keep the fuel away from the oxygen electrode for the purpose of reducing the formation of mixed potentials. The fuel electrode is in fact active for oxygen electrode reactions after the fuel catalyst activation process, but direct contact between the fuel electrode and the oxygen can readily be prevented with a baffle construction. Activity and useful life of the catalyst, especially when used in an oxygen electrode, is improved to a high degree by the present invention, so that the utilization of chelates of the kind above mentioned, for example, CoTAA, at least for a relatively long time, has only become possible at all as the result of the present invention.

The invention is further described by reference to the following Examples:

EXAMPLE I: FUEL CATALYST 500 mg CoTAA are flushed with nitrogen at room temperature for an hour and then held at a temperature of 420°C for 4 hours in nitrogen. A part of the chelate sublimes away and a residue of 320 mg of a gleaming black reaction product are obtained. 6 mg thereof are ground with 6 mg of acetylene soot in a mortar and then spread between two graphite felt disks about 2 mm thickness having a surface of 5 cm². The electrode thus obtained is secured in a Plexiglas holder provided with an electric current lead made of a Ti-Pd alloy. At a potential of 350 mV relative to the hydrogen electrode in the same electrolyte, formic and sulfuric acids in the proportion of 2N $H_2SO_4$ + 3M HCOOH are placed in a half-cell arrangement at 70°C, with the result that an oxidation current for the formic acid of 41 mA is measured. This corresponds to a catalyst activity of 6.8 A/g.

EXAMPLE II: OXYGEN CATALYST 1 gram of activated charcoal is intimately mixed with 0.5 g of CoTAA in a beater mill and is then tempered in a nitrogen atmosphere, first for 16 hours at 420°C and immediately thereafter for one hour at 800°C. The material thus obtained is mixed with enough PTFE emulsion that the PTFE content corresponds to 15 percent by weight of the mixture of activated charcoal and CoTAA. After good intermixing the emulsion medium (PTFE: polytetrafluoroethylene) is removed by suction, so that a cohesive hydrophobic mass is formed. This material is spread with a spatula in a thin layer on a porous PTFE sheet having a surface of 2 cm². The electrode is made fast in a Plexiglas holder and is exposed to contact with oxygen through the PTFE foil and to the electrolyte on the other side through a piece of graphitic felt. For a layer of 5 mg active material per cm², such an electrode can operate at 5 A/g at room temperature in 4.5N $H_2SO_4$ at a potential of 740 mV. This activity can be maintained for several thousand hours.

Nitrogen is preferred as the inert gas for the heat treating atmosphere. Other non oxidising gases such as hydrogen, helium or argon can also be used as inert gases.

Similar results have been obtained when applying the process to the iron and/or copper and/or nickel species.

We claim:

1. A stable oxygen electrode which retains its useful catalytic activity over a long service life, comprising an electrode carrier containing an activated transition metal chelate of 5,14-dihydrodibenzo(5,9,14,18)-tetraaza(14)-annulene, said activated metal chelate having been activated by heating in an inert gas atmosphere at a temperature between about 600°C and 1000°C for a minimum time of 5 minutes.

2. The electrode of claim 1, wherein said metal is selected from the group consisting of cobalt, iron, copper and nickel.

3. The electrode of claim 1, wherein said metal chelate is the cobalt chelate.

4. The electrode of claim 3, wherein said catalytic material is admixed with an active form of carbon.

5. The electrode of claim 1 wherein said inert gas is nitrogen.

6. The electrode of claim 5, wherein said metal chelate is the cobalt chelate which had been activated by heating to between about 600°C and 850°C.

7. The electrode of claim 6 wherein said catalytic material is admixed with an active form of carbon.

8. The electrode of claim 7, wherein said metal chelate had been activated by heating to about 800°C.

* * * * *